United States Patent Office 2,915,487
Patented Dec. 1, 1959

2,915,487

WATER-DISPERSIBLE POLYESTER AMINOPLAST CONDENSATION RESINS AND METHODS FOR PRODUCING THEM

James P. Shelley, Drexel Hill, Pa., assignor to Rohm & Haas Company, Philadelphia, Pa., a corporation of Delaware No Drawing. Application March 3, 1958
Serial No. 718,468

10 Claims. (Cl. 260—21)

The present invention is related to new polyester-aminoplast condensation resins which are dispersible in water without the aid of emulsifying agents or dispersing agents. It is particularly concerned with the production of such resins that are adapted to be used in aqueous systems for various applications as in coatings, adhesives and so forth. This application is a continuation-in-part of my copending application Serial No. 569,303, filed March 5, 1956, now abandoned.

The production of water-borne oil-modified alkyd resins using air-drying oils as the effective means for converting coatings and other masses formed from such alkyds into insoluble condition is known. However, the curing action, depending upon oxidation during air-drying even when accelerated at elevated temperatures, is relatively slow. Alkyds have also been modified by coreaction with thermosetting resinous condensates, such as those of phenolformaldehyde, urea-formaldehyde and melamine-formaldehyde. However, the products of such coreaction are generally insoluble in water, thereby requiring application from organic solvents with accompanying fire and health hazards, to say nothing of the greater expense usually entailed by the use of organic solvents as compared to aqueous or essentially aqueous systems. When such alkyd-thermosetting resin condensates have been modified heretofore by the inclusion of large proportions of hydrophilic groups in order to obtain water-dispersibility, films and other products obtained from aqueous systems containing such condensates are generally inadequately resistant to moisture for most practical uses or, when water-dispersability is obtained by reduction in molecular weight of the condensate, films obtained from such compositions have generally been lacking in cohesion, flexibility, and toughness, so that they are generally of a character colloquially termed "cheesy."

Applicant has discovered that an alkyd-aminoplast condensation product can be obtained which has excellent curing qualities, produces films of good cohesion, flexibility, and toughness, and yet are self-dispersible in aqueous systems. The condensation product of the present invention may be generally characterized as the coreaction product of three components as follows:

(A) An alkyd of about 2000 to 10,000 molecular weight containing available hydroxyl groups;

(B) a water-insoluble aminoplast soluble in such organic solvents as butanol, isopropanol and monoalkyl ethers of diethylene glycol in which the alkyl group is methyl, ethyl, or the like; and (C) A special polyester having an average molecular weight of about 800 to 1500 containing hydroxyl groups available for condensation with the aminoplast and free carboxyl groups available for neutralization by means of ammonia, an amine, or a quaternary ammonium compound.

COMPONENT A

Component A may be any of the common alkyd resins including oil-modified alkyd resins. For example, simple alkyds that may be used may be those obtained by condensing a dicarboxylic acid, such as o-phthalic, terephthalic, isophthalic, pyromellitic, succinic, glutaric, adipic or sebacic acids, with a polyol or polyhydric alcohol, such as ethylene glycol, diethylene glycol, glycerol, pentaerythritol, sorbitol, inositol, trimethylolethane ($H_3CC(CH_2OH)_3$) tetramethylolcyclohexanol, di- and poly-pentaerythritol. The polyol employed is ordinarily an aliphatic compound formed of C, H, and O atoms in which there are from 2 to 10 carbon atoms and 2 to 6 hydroxyl groups. Preferably the polyhydric alcohol component from which the alkyd is derived comprises at least 25% by weight of at least one alcohol containing at least three hydroxyl groups in order to provide an excess of hydroxyl groups available for reaction with the aminoplast (Component B). If desired, there may be used as a part of the dicarboxylic acid component one or more ethylenically unsaturated acids, such as maleic acid, fumaric acid, or the polycarboxylic acid compounds obtained by interacting maleic anhydride with abietic acid, ricinoleic or eleostearic acids. The unsaturated dicarboxylic acid may amount to fifty percent of the total dicarboxylic acid used, but is preferably not over 25% of such total.

The alkyds may be modified with a higher monobasic aliphatic acid having 12 to 30 carbon atoms, such as a fatty acid or fatty acid mixture derived from drying, semi-drying, or nondrying oils or fats in which the fatty acid has from 12 to 30 carbon atoms and up. The modifying fatty acid may be lauric acid, myristic acid, coconut oil fatty acids, palm oil fatty acids, palmitic acid, oleic acid, stearic acid, linolenic acid, or fatty acids obtained by hydrogenation of fish, animal, or vegetable oils or fats.

In preparing the alkyd, the glycerol or other polyhydric alcohol or mixture thereof may first be partially esterified with the monoacid or mixture thereof, and the resulting partial ester may then be reacted with the dicarboxylic acid, such as phthalic acid. Alternatively, the dicarboxylic acid, the polyhydric alcohol and the monocarboxylic acid may be mixed together and reacted simultaneously. It is preferred to use alkyds modified with essentially saturated, non-drying fatty acids to assure freedom from yellowing and embrittlement on ageing. Preferred alkyds may be obtained from 39% to 50% phthalic acid, 20% to 30% glycerol, and 30% to 35% coconut fatty acids. The preparation of the alkyd is in itself no part of the present invention, since conventional oil-modified alkyds may be used.

The alkyd of which Component A is constituted is essentially a water-soluble product that is soluble in organic solvents, such as butanol, pentanol, the monoethyl ether of ethylene glycol and the like, has an average molecular weight of about 2000 to about 10,000 and an acid number of about 3 to 7. Such alkyds have excellent film-forming qualities but are not adapted to be applied from aqueous systems in the production of coatings or other materials.

COMPONENT B

Component B consists of a water-insoluble alkylated polymethylol nitrogen compound obtained by the reaction of formaldehyde or substances yielding formaldehyde and certain alcohols on a nitrogen compound selected from the group consisting of urea, thiourea, and aminotriazines including guanamines, such as acetoguanamine and benzoguanamine, melamine and substituted melamines. The alkylation should be that resulting from an alcohol having from 3 to 6 carbon atoms, such as isopropanol, n-propanol, butanol, pentanol, hexanol, or cyclohexanol, so that the aminoplast will be soluble in such solvents as butanol, isopropanol, pentanol and the like. Examples of the substituted melamines include, N,N-dialkylmelamines in which the alkyl group has from 1 to 4 carbon atoms, e.g. methyl, ethyl, propyl, isopropyl, and n-butyl, also N,N'-dialkylmelamines in which the alkyl group may be any of those just stated, N-monoalkylmelamines in which the alkyl group may be any of those stated. The alkylated polymethylol nitrogen compound is of water-insoluble character and so hydrophobic that it is not self-dispersible in water. The preparation of the alkylated polymethylol nitrogen-containing compound is in itself no part of the present invention since these condensation products are well-known and available commercially.

COMPONENT C

Component C is a special low molecular weight polyester containing hydroxyl groups adapted to enable its coreaction with the aminoplast (Component B) and some carboxyl groups for neutralization. The acid number of Component C should be between about 90 and 120, and in general, the preferred acid number is about 100. This polyester is formed by first condensing a dibasic aliphatic acid having from five to ten carbon atoms with a polyol or a mixture of polyols containing at least 25 mole percent of a polyol having three or more hydroxyl groups therein. For example, the polyol may contain up to 75 mole percent by weight of a diol, such as ethylene glycol, diethylene glycol, propylene glycol, dipropylene glycol, and trimethylene glycol, 1,3-butane-diol, 1,4-butane-diol, and 1,5-pentane-diol. Examples of the polyols containing more than two hydroxyl groups that may be used include glycerine, sorbitol, pentaerythritol, inositol, tetramethylolcyclohexanol, di- and poly-pentaerythritol, and so forth, but trimethylolethane is preferred. The polyol employed is ordinarily an aliphatic compound formed of C, H, and O atoms in which there are from 2 to 10 carbon atoms and 2 to 6 hydroxyl groups. Preferably, the proportion of diol is not over 50 mole percent of the entire polyol component and, of course, the diol may be completely absent.

The aliphatic dicarboxylic acid that is used may be adipic acid, succinic acid, glutaric acid, sebacic aid or the like. Preferably it contains from 5 to 8 carbon atoms, but it may contain 4 to 18 carbon atoms.

The polyol and dibasic aliphatic acid are mixed in the proportion of 1.2 to 1.8 moles of polyol to each mole of acid, preferably 1.2 to 1.5 moles of polyol being used for each mole of acid. The mixture is heated to a temperature within the range of about 200° to 260° C. in the presence of an inert gas, such as carbon dioxide, nitrogen, argon, helium, when atmospheric or higher pressures are employed. If desired, a reduced pressure may be present during the reaction to remove the water formed on esterification and to favor a shift in the equilibrium toward the esterification product. Pressures of 20 to 50 mm. or more absolute pressure may be used. Optionally, an esterification catalyst may be used, such as 0.1 to 1% of sulfuric acid, toluene-sulfonic acid, zinc chloride, or phosphorus pentoxide. Such catalyst, however, is not necessary. The reaction is carried out until the acid number is reduced to a value of 10 or less. Preferably, the acid number is reduced to a value of less than 5.

The polyester obtained has terminal hydroxyl groups and also some hydroxyl groups at intervals along the polyester molecule.

Instead of using the free dibasic acid itself as one of the starting materials in this esterification reaction, there may be used the lower alkyl diesters of the dibasic acids, such as the dimethyl or diethyl esters. Reaction in this case involves an ester interchange and sometimes has the advantage of yielding a product having less color. In this procedure, the alcohol liberated is boiled off.

Optionally, the polyester may be modified with a fatty acid having 8 to 30 carbon atoms, such as lauric acid, stearic acid, oleic acid, linoleic acid, linolenic acid, palmitic acid, and ricinoleic acid. The modification may be effected by directly reacting the fatty acid with the polyol or with the hydroxyl-containing polyester; alternatively, the same result may be effected by transesterification, in which case an ester of the fatty acid, such as an ester thereof with glycerol, is reacted with the polyol or the hydroxyl-containing polyester in the presence of a suitable catalyst, such as an alkali metal alkoxide. There should be used from 1 to 3 moles of polyol or polyol mixture to each mole of the fatty acid (or the equivalent thereof in the case of an ester thereof when transesterification is employed); preferably there is used from about 1.2 to 1.5 moles of polyol to each mole of acid or equivalent of ester. When modification with a fatty acid is resorted to, it is preferable to react the monobasic fatty acid or its ester (in the case of transesterification) with the polyol or a part of it before the polyol is reacted with the dibasic acid. Thus, when a modified polyester is desired, the fatty acid or ester thereof, such as a fat or oil, is first mixed with the polyol or polyol mixture and the esterification or transesterification with the monobasic fatty acid is carried out under the same conditions as stated hereinabove in respect to the esterification with a dibasic acid. Thus, the temperature may be from 200° to 260° C.; the pressure from 20 mm. absolute up to atmospheric or higher, an inert gas being used preferably at atmospheric or higher pressures. Optionally, an esterification or transesterification catalyst may be used as before. The reaction is continued until the acid number reaches a value of 10 or less. Preferably, it is continued until the acid number reaches a value of less than 1. It is desirable that the monobasic acid be completely bound up in the ester product, and to this end the most desirable condition is attained when the acid number approaches or reaches a value of zero. The esterification product obtained from the polyol and monobasic acid is then mixed with the dibasic acid and any additional amount of polyol needed to bring the proportion of polyol used in the entire condensation reaction to a proportion of between 1.2 and 1.8 moles of polyol to one mole of the dibasic acid. This esterification reaction is continued under the same conditions as stated hereinabove in describing the preparation of the simple polyester unmodified with monobasic acid. As in the previous case, the reaction is continued until the acid number of the product is reduced to a value of 10 or less and preferably to a value of less than 5. The oil modified polyester in this instance has some of its hydroxyl groups esterified with monoacyl radicals derived from the fatty acid. Of course, a mixture of fatty acids may be employed instead of a single one and similarly a mixture of dibasic acids may be employed instead of a single one whether an oil-modified polyester or an unmodified polyester is to be prepared up to this point.

The unmodified or oil-modified polyester thus prepared is then reacted with o-phthalic acid or o-phthalic acid containing lower alkyl substituents in the benzene ring, such as methyl, ethyl, propyl, or butyl substituents or with the anhydrides thereof. The use of the anhydrides is preferred because of their solubility in the polyester at this stage and the ease of reaction of one carboxylic group thereof, apparently without appreciable reaction of both such groups which would lead to cross-linking, water-insolubility, and gelation. Any other polycarboxylic acid such as isophthalic acid or terephthalic acid, has not been found satisfactory in this phase of the preparation of the polyester, either because of insolubility and lack of reactivity therein, or, in some instances, because of rapid cross-linking to a water-insoluble, gel stage. The amount of the phthalic acid or its derivative or anhydride used is in the proportion of 2 to 3.5 mole for every 3 moles of the polyol. When the polyol consists entirely of one containing 3 hydroxyl units, it is preferred to use approximately 2 moles of the phthalic acid for 3 moles of the polyol. The reaction with the phthalic acid is believed to provide terminal carboxyphenyl groups on the polyester molecules. The reaction of the mixture of phthalic acid with the unmodified or oil-modified polyester may be effected at a temperature of 150° to 170° C. for a period of 1 or 2 hours. The reaction is continued until the acid number is reduced to 120 but is stopped before the acid number is reduced appreciably below 90. When the desired acid number within the range of 90 to 120 is reached, the reaction mixture is cooled to a temperature below 60° C. and preferably down to 20° or 30° C. to stop the esterification reaction. The reaction product thereby obtained provides Component C for reaction as will be described hereinbelow.

CONDENSATION OF COMPONENTS A, B, AND C

The condensation product of components A, B, and C may be made in either of two ways. In the first which is applicable generally to the preparation of ABC condensation products in which the proportions of the several components may fall within any part of the ranges given below, Component A (alkyd) is first reacted only with Component B (aminoplast) and the resulting condensation product is reacted with the high acid polyester (Component C). An alternative procedure, which can be employed in certain ranges of proportions, involves the simultaneous reaction of all three components within a mixture thereof.

In the first procedure, the condensation product of Components A, B, and C is obtained by first reacting the alkyd (Component A) with the aminoplast (Component B). They may be reacted in organic solvents at a concentration of 50% to 80% solids; for example, Component A may be dissolved in xylene, benzene, toluene, ketones, such as dioxane or methylethyl ketone, or in monobutyl ether of ethylene glycol, butanol or mixtures of such solvents. Similarly, the aminoplast (Component B) may be dissolved in butanol or a mixture of butanol and xylene or in any other mixture of the various solvents just mentioned. Component A and Component B are reacted in proportions of about 20 to 65 parts by weight of Component A to about 20 to 30 parts by weight of Component B. The reaction of the mixture is effected in the organic solvent solution at a temperature of 60° to 120° C., and preferably at a temperature of 70° to 90° C., at atmospheric pressure. The reaction is carried out until an advance in viscosity of at least 3 poises is obtained when measured at 60% solids concentration in any particular organic solvent at room temperature.

The organic solvent solution of the reaction product of A and B is then mixed with the polyester whether unmodified or oil-modified constituting Component C in proportions of about 7 to 60 parts by weight of Component C, preferably about 50 parts thereof, to 50 parts by weight of the reaction product of A and B. Component C may be added to the reaction product of A and B as such or it may be dissolved first in an organic solvent, such as toluene, xylene, benzene, or monalkyl ethers of ethylene glycol, such as the monobutyl ether thereof, at concentrations of 50% to 90% solids, preferably as high as possible consistent with the working of viscous medium. The reaction is effected in the organic solvent solution at 50% to 80% solids content at a temperature of about 60° C. for about one-half hour. Preferably, the concentration of the reactants in the organic solvent, and consequently of the reaction product therein, is maintained as high as possible consistent with manipulability which depends upon the viscosity. This reaction is continued for a time sufficient to raise the viscosity at least 2 poises when measured at 60% solids concentration in an organic solvent at room temperature.

In the alternative procedure, organic solvent solutions of components A, B, and C are mixed in a suitable reaction vessel in proportions of about 15 to 25% of Component C, about 20 to 35% of Component B, and the balance (40% to 65%) of Component A to make a total of 100%. The total concentration of A, B, and C is preferably about 50 to 80% and the reaction is effected at 60° to 120° C., preferably at 70° to 90° C., at atmospheric pressure. The reaction is carried out until the viscosity rises by 20 to 30 poises when measured at 60% solids concentration in the particular solvent used at room temperature.

Regardless of which condensation procedure described above is used, the reaction is stopped by neutralization. If the temperature of the batch to be neutralized is near or above the boiling point of the base used for neutralization, the batch is preferably cooled first. For example, the reaction product ABC may be cooled below 60° C., such as to 25° to 55° C., and then it is neutralized or at least partially neutralized with ammonia, an amine, or a quaternary ammonium compound. Cooling may be particularly necessary when ammonia or a low-boiling amine is used for neutralization. If desired, a small proportion of the neutralizing component may be a fixed base, such as potassium or sodium hydroxide, or carbonates. However, it is preferred to use as the entire neutralizing agent either ammonia, a volatile amine or a quaternary ammonium compound or a mixture of 2 or 3 of such materials. When ammonia is the neutralizing agent, it is generally introduced as an aqueous solution. Preferably the ammonia is rather concentrated when it is desired to store or ship the product in order to save bulk. However, the ammonia may be sufficiently dilute to directly produce an aqueous solution or dispersion of the condensation product of the present invention having the desired solids concentration for direct application, such as in coatings, adhesives, impregnants, and so forth. When an amine or a quaternary ammonium compound is used as the neutralizing agent, it may be added without adding water so that the neutralized condensation product of the invention is essentially anhydrous but is capable of practically unlimited dilution with water without being coagulated. Such amines as monoethylamine, triethylamine, dimethylamine, trimethylamine, and morpholine are quite suitable as neutralizing agents. Also quaternary ammonium compounds, such as choline, trimethylbenzylammonium chloride, methylpyridinium chloride, may be used for neutralization. As in the case of the amines, they may be used without the addition of water so that the product is obtained as a substantially anhydrous solution or dispersion which is dilutable with water to practically unlimited extent. If desired, the amines or the quaternary ammonium compounds may be introduced as aqueous solutions and, in the case of ammonia, a dilution may be such as to provide concentration of the condensation product desired for application in coatings, adhesives and so forth. On the other hand, the substantially anhydrous products obtained by neutralization by an amine or a quaternary ammonium compound may be stored or shipped in that concentrated form and then diluted with water for application at the point of its destined use.

The condensation product of the present invention thereby obtained may be used for the purpose of providing clear coatings, impregnants, or adhesive compositions, or it may be pigmented. Examples of pigments that may be used include clays, kaolin, china clay, satin white, titanium dioxide, lithopone, barium sulfate, p-toner red, chrome green, ultramarine blue and the like. The amount of pigment that may be incorporated may be from 10% to 250% by weight of the condensation product. The pigment may be worked into the organic solvent solution of the condensation product before or after neutralization, or it may be worked into aqueous solutions thereof having any desired concentration of the condensation product. It is characteristic of the composition of the present invention that no curing catalyst need be added to accelerate the insolubilization by baking after application of the coating or the impregnant.

When a clear coating or impregnant is desired and the composition does not contain a pigment, the organic solvent solution of the condensation product obtained by neutralization with an amine or quaternary ammonium compound or the neutralized aqueous medium obtained by treatment with ammonia may be applied as a coating without dilution. However, it is preferred to reduce the concentration by the addition of water until a concentration of 5% to 40% solids is obtained at which concentration the composition may be applied as a coating, impregnant or otherwise. Any suitable manner of impregnation or coating may be employed, such as dipping, roller-coating, knife coating, or spraying; spraying usually being effected at 20% to 25% solids. The composition may be applied to wood, metal, glass, to textile fabrics as in pigment printing or dyeing, paper, cardboard, leather, asbestos-cement products, asphalt tile, linoleum, cork, masonry, including bricks, stone, ceramic tile, and other clay products. After application of the coating or impregnation, the condensate is cured by baking at 250° to 350° C. for one-half hour whenever the substrates permit such temperature. Substrates, such as wood, which cannot stand such temperatures may be cured by heating at 60° C. (140° F.) for a period of 8 to 24 hours. The baking operation at high temperatures may be preceded by an ordinary drying step at room temperature or at elevated temperatures.

The films obtained from the condensate of the present invention are characterized by excellent adhesion to the substrate, good flexibility adapting it to such flexible bases as leather, paper and the like, and toughness which renders the coating or film resistant to shattering and severe penetration on impact. In the field of application as baking finishes for washing machines, refrigerators, kitchen ranges and automobiles, they may be applied as one component coating, such as the top coat, over other priming finishes, or two or more coatings of the condensation product of the present invention may be applied, one over the other, to provide the entire finish if desired.

In the following examples, which are illustrative of the invention, the parts are by weight unless otherwise specified:

PREPARATION OF POLYESTER (COMPONENT C)

Example A

Into a reaction vessel, there are introduced 292 grams of adipic acid (2.0 moles) and 360 grams of trimethylolethane (3 moles) of the formula $(H_3CC(CH_2OH)_3)$. Heat and reduced pressure are applied and the batch held at 230° C. until the acid number value falls below 4.0. The reaction mixture is then cooled to ca. 160° C., vented and 296.0 grams of o-phthalic anhydride (2.0 moles) is charged. The mixture is heated to 150° to 160° C. at atmospheric pressure and held at this temperature until the acid number of the batch falls to ca. 100. At this point, full cooling is applied to the batch and sufficient sylol is charged to adjust the solids content of the batch to ca. 85%.

Example B

The procedure of Example A is repeated replacing the adipic acid with 404.0 grams of sebacic acid (2 moles) and the polyol with 332.0 grams of glycerine (3.6 moles).

Example C

The procedure of Example A is repeated replacing the adipic acid with 236.0 grams of succinic acid (2 moles) and the polyol with 437.0 grams of sorbitol (2.4 moles).

Example D

The procedure of Example A is repeated replacing the adipic acid with 264.0 grams of glutaric acid (2 moles) and the polyol with 340.0 grams of pentaerythritol (2.5 moles).

Example E

The procedure of Example A is repeated replacing the polyol with a mixture of 233.0 grams of diethylene glycol (2.2 moles) and 96.0 grams of trimethylolethane (0.8 mole) of the formula $(H_3CC(CH_2OH)_3)$.

Example F 200 grams (1.0 mole) of lauric acid and 156.0 grams (1.3 moles) of trimethylolethane of the formula $(H_3CC(CH_2OH)_3)$ are heated under reduced pressure (total pressure=ca. 30 mm. Hg) to a temperature of 230° C. The mixture is held at this temperature until the acid number of the batch (mg. KOH required to neutralize 1.0 gram) falls below 1.0. The system is then cooled to below 170° C., vented and 292.0 grams of adipic acid (2.0 moles) and 204.0 grams of trimethylolethane (1.7 moles) are charged. Heat and reduced pressure are re-applied and the batch again held at 230° C. until the acid number value falls below 4.0. The reaction mixture is then cooled to ca. 160° C., vented and 296.0 grams of o-phthalic anhydride (2.0 moles) is charged. The mixture is heated to 150° C. to 160° C. at atmospheric pressure and held at this temperature until the acid number of the batch falls to ca. 100. At this point, full cooling is applied to the batch and sufficient xylol is charged to adjust the solids content of the batch to ca. 85%.

Example G

The procedure of Example F is followed substituting 364.0 grams of sebacic acid (1.8 moles) for the adipic acid.

Example H

The procedure of Example F is followed substituting 138.0 grams of diethylene glycol (1.3 moles) for the first charge of trimethylolethane of the formula $(H_3CC(CH_2OH)_3)$.

Example I

The procedure of Example F is followed substituting 264.0 grams of glutaric acid (2 moles) for the adipic acid and 120.0 grams of glycerol (1.3 moles) for the first charge of trimethylolethane.

Example J

The procedure of Example F is followed substituting 427.0 grams of stearic acid (1.5 moles) for the lauric acid.

Example K

Charge 444 grams of soybean oil to a reaction vessel along with 120 grams of trimethylolethane (1.0 mole) of the formula $(H_3CC(CH_2OH)_3)$. Heat is applied to the mixture and nitrogen gas is sparked through the batch continuously throughout the reaction. At 130° C., 1.0 gram of a 25° solution of sodium methylate in methanol is added to the batch. The heating is continued. At 165° C., 0.5 gram of triphenylphosphite is charged to the batch. Heating is continued to a batch temperature of 230° to 240° C. The mixture is held in this temperature range about five minutes until a clear "pill" is obtained in cooled droplets from a rod dipped into the mixture. The mixture is then cooled to approximately 180° C., at which point there is charged 438 grams (3 moles) of adipic acid and also another 360 grams (3 moles) of the trimethylolethane, and heating is once more resumed. The batch is heated to 260° and held at this temperature until the acid number drops to less than 2.0. Then the batch is cooled to 170° C. and 444 grams (3 moles) of phthalic anhydride are charged. Heating is again resumed. The batch is heated to 150° to 160° C.

until the acid number drops to 90 to 100, at which point the reaction is probably complete and full cooling is applied. At a temperature of 110° C., the batch is diluted to about 85% solids with 300 grams of xylol.

Example L

The procedure of Example K is repeated substituting 444.0 grams of coconut oil for the soybean oil.

PREPARATION OF CONDENSATION PRODUCTS

Example 1

A mixture of 100 grams of a 60% solution in xylene of a butylated polymethylolmelamine and 100 grams of a 60% solution in xylene of a coconut oil-modified glycerol-phthalic acid alkyd resin having an acid number of about 5 containing about 47% phthalic acid, about 20% glycerol and about 33% of coconut fatty acids and is heated with agitation to 70° to 80° C. at atmospheric pressure. The mixture is held at this temperature with continuous agitation until the viscosity of the batch advanced about 15 poises from its original viscosity (when measured at 25° C. and at a 60% concentration). The reaction is then stopped by cooling the batch to room temperature. During the cooling, there is gradually added 100 grams of the polyester product of Example A.

The entire mixture is stirred at room temperature for ca. ½ hour to insure reasonably thorough mixing before any heat is applied. The mixture is then heated to 55° to 60° C. and held in this range for one-half hour. At the end of this time, reaction is stopped by applying cooling to the batch and adding an amount of concentrated aqueous NH₃ (ca. 28%) or triethylamine (100%) equal to 20% of the weight of polyester solids present.

The product is then diluted with water to 25% solids concentration and sprayed on glass and metal panels, dried and baked for 30 mintues at 250° F. Clear glossy coatings are obtained which are water-resistant, hard, and adhere well to the substrates on which coated. Cellophane is similarly coated.

Example 2

The procedure of Example 1 is followed substituting 120 grams of the polyester of Example F for the polyester of Example A therein used.

The coreaction product obtained after neutralization with triethylamine is mixed with about 240 grams of titanium dioxide, and the mixture is passed through a colloid mill, then diluted with water to 20% solids concentration. The resulting dispersion is sprayed onto metal panels, dried, and baked at 300° F. for thirty minutes. The coatings adhere well to the metal base, are hard, glossy, and water-resistant.

Example 3

The procedure of Example 2 is repeated in successive runs substituting for the polyester there used 120 grams of each of the polyesters of Examples B to E and G to L. Similar glossy, hard, water-resistant coatings are obtained.

Example 4

The procedure of Example 2 is followed except that 120 grams of the polyester of Example K is substituted for the polyester of Example F and 100 grams of a 60% solution in xylene of a linseed oil-modified glycerol phthalate containing about 33% phthalic anhydride, about 20% glycerol and 47% linseed oil and having an acid number of about 5 is substituted for the alkyd solution there used.

Glossy, hard, water-resistant coatings are obtained on metal and glass panels.

Example 5

The procedure of Example 1 is repeated except that 100 grams of a 50% solution of a butylated dimethylolurea is substituted for the melamine resin. Similar clear, glossy coatings are obtained.

Example 6

The procedure of Example 1 is repeated except that 100 grams of a 45% solution of N,N'-diisopropoxymethyl-imidazolidinone-2 is substituted for the melamine resin. Similar clear, hard and glossy coatings on metal bases are obtained.

Example 7

The procedure of Example 2 is repeated substituting 100 grams of a 60% solution in xylene of a butylated polymethylol - N,N - dimethylmelamine. Similar hard, glossy coatings are obtained.

Example 8

(a) A mixture of 2300 grams of a 60% solution in xylene of a glycerol-phthalic acid alkyd modified by a mixture (in about 50:50 mole ratio) of myristic acid and capric acid containing about 44% phthalic acid, about 20% of glycerol and about 36% of the fatty acid mixture and having an acid number of about 5, 1250 grams of a 60% solution in a (50:50 weight ratio) mixture of n-butyl alcohol and xylene of an n-butylated methylolated melamine condensate, and 442 grams of the 85% solution of polyester obtained in Example F is prepared in glass reaction vessel. The mixture is agitated at room temperature for about 10–15 minutes till the solution becomes homogeneous and clear. Its viscosity is found to be 14 poises. It is heated to about 60° C. and maintained in the temperature range of 55° to 65° C. until the viscosity reached 40 poises (by testing samples drawn periodically and cooled to 25° C.). The heating is then discontinued and 150 grams of triethylamine is charged to the batch. The mixture is stirred over a period of 20–30 minutes, stopping the reaction and neutralizing the products to produce a salt which is self-dispersible in water. The neutralized product was filtered through a varnish filter (consisting of a cheesecloth supported on a conically-shaped cardboard) and then diluted with water to a 55% solids concentration.

(b) A pigment dyeing of a cotton fabric was obtained by padding the fabric through a composition comprising:

1% of the 55% solution of part a
½% copper phthalocyanine blue
0.05% t-octylphenoxypolyethoxyethanol containing about ten oxyethylene units
0.075% sodium alginate Water to make 100% and sufficient NH₄OH to raise the pH to about 8.5. After one dip and one nip between squeeze rolls, the fabric was dried at 140° F. and heated at 300° F. for five minutes. A wash-resistant and dry-cleaning resistant dyeing was obtained.

Example 9

A water-dispersible condensate is prepared by the procedure of Example 8 except that the quantities of the several components are changed as follows:

835 grams of 60% xylene solution of the first-mentioned alkyd resin
500 grams of the 60% solution of melamine resin
235 grams of the 85% xylene solution of high acid number polyester,
80 grams of triethylamine.

Coatings obtained were essentially of the same character as those made with the product of Example 8.

It is to be understood that changes and variations may be made without departing from the spirit and scope of the invention as defined in the appended claims.

I claim:

1. A composition comprising an aqueous dispersion of a salt of a condensation product of (1) about 20 to 35 parts by weight of a xylene-soluble butylated polymethylol melamine with (2) about 40 to 65 parts by weight of an alkyd having an average molecular weight of about 2,000 to 10,000 and an acid number of about 3 to 7, selected from the group consisting of (A) polyester condensation products of a dicarboxylic acid with a polyhydric alcohol having 2 to 10 carbon atoms and 2 to 6 hydroxyl groups and (B) the polyester condensation products of (A) modified by reaction with a monobasic fatty acid having 12 to 30 carbon atoms, and (3) about 15 to 25 parts by weight of a polyester defined hereinafter, said dispersion being obtained by heating a mixture of (1), (2), and (3) above in the proportions stated, to effect reaction therebetween, in an organic solvent at a total concentration of (1), (2), and (3) in the range of 50 to 80% by weight and subsequently neutralizing the reaction mass with a member selected from the group consisting of aqueous ammonia and water-soluble, volatile amines, said polyester (3) containing hydroxyl groups and free carboxyl groups and having an average molecular weight of about 800 to 1500 and an acid number between about 90 and about 120, the polyester being a condensation product of an aromatic member selected from the group consisting of o-phthalic acid and its anhydride with a condensation product selected from the group consisting of (a) polyesters having an acid value of not over 10 and obtained from the condensation of a mixture of at least one dibasic aliphatic acid having 5 to 10 carbon atoms with at least one aliphatic 2-carbon to 10-carbon atom polyol, said polyol consisting of polyol molecules having 2 to 6 hydroxyl groups and containing at least 50 mole percent of trimethylolethane, the proportions in the mixture being in the range of 1.2 to 1.8 moles of polyol to each mole of acid, and (b) polyesters as obtained in (a) but modified by condensation with a fatty acid having 8 to 30 carbon atoms, said modified polyesters having an acid value of not over 10; the proportion of the aromatic member to the total polyol being in the range of 2 to 3.5 moles of the former for each 3 moles of the latter.

2. A composition as defined in claim 1 in which neutralization is effected by an aqueous solution of ammonia.

3. A composition as defined in claim 1 in which neutralization is effected with triethylamine.

4. A composition comprising an aqueous dispersion of a salt of a condensation product of (1) about 20 to 35 parts by weight of a xylene-soluble butylated polymethylol melamine with (2) about 40 to 65 parts by weight of an alkyd having an average molecular weight of about 2,000 to 10,000 and an acid number of about 3 to 7, selected from the group consisting of (A) polyester condensation products of a dicarboxylic acid with a polyhydric alcohol having 2 to 10 carbon atoms and 2 to 6 hydroxyl groups and (B) the polyester condensation products of (A) modified by reaction with a monobasic fatty acid having 12 to 30 carbon atoms, and (3) about 15 to 25 parts by weight of a polyester defined hereinafter, said dispersion being obtained by heating a mixture of (1), (2), and (3) above in the proportions stated, to effect reaction therebetween, in an organic solvent at a total concentration of (1), (2), and (3) in the range of 50 to 80% by weight and subsequently neutralizing the reaction mass with a member selected from the group consisting of aqueous ammonia and water-soluble, volatile amines, said polyester (3) containing hydroxyl groups and free carboxyl groups and having an average molecular weight of about 800 to 1500 and an acid number between about 90 and about 120, the polyester being a condensation product of an aromatic member selected from the group consisting of o-phthalic acid and its anhydride with a condensation product selected from the group consisting of a polyester having an acid value of not over 10 and obtained from the condensation of a mixture of adipic acid with trimethylolethane, the proportions in the mixture being in the range of 1.2 to 1.8 moles of trimethylolethane to each mole of acid, and modified by condensation with soybean oil acids; the proportion of the aromatic member to the total trimethylolethane being in the range of 2 to 3.5 moles of the former for each 3 moles of the latter.

5. A composition as defined in claim 4 in which neutralization is effected by an aqueous solution of ammonia.

6. A composition as defined in claim 4 in which neutralization is effected with triethylamine.

7. A composition comprising an aqueous dispersion of a salt of a condensation product of (1) about 20 to 35 parts by weight of a xylene-soluble butylated polymethylol melamine with (2) about 40 to 65 parts by weight of a linseed oil-modified glycerol phthalate having an average molecular weight of about 2,000 to 10,000 and an acid number of about 3 to 7, and (3) about 15 to 25 parts by weight of a polyester defined hereinafter, said dispersion being obtained by heating a mixture of (1), (2), and (3) above in the proportions stated, to effect reaction therebetween, in an organic solvent at a total concentration of (1), (2), and (3) in the range of 50 to 80% by weight and subsequently neutralizing the reaction mass with a member selected from the group consisting of aqueous ammonia and water-soluble, volatile amines, said polyester (3) containing hydroxyl groups and free carboxyl groups and having an average molecular weight of about 800 to 1500 and an acid number between about 90 and about 120, the polyester being a condensation product of an aromatic member selected from the group consisting of o-phthalic acid and its anhydride with a condensation product selected from the group consisting of a polyester having an acid value of not over 10 and obtained from the condensation of a mixture of adipic acid with trimethylolethane, the proportions in the mixture being in the range of 1.2 to 1.8 moles of trimethylolethane to each mole of acid, and modified by condensation with soybean oil acids; the proportion of the aromatic member to the total trimethylolethane being in the range of 2 to 3.5 moles of the former for each 3 moles of the latter.

8. A composition comprising an aqueous dispersion of a salt of a condensation product of (1) about 20 to 35 parts by weight of a xylene-soluble butylated polymethylol melamine with (2) about 40 to 65 parts by weight of a linseed oil-modified glycerol phthalate having an average molecular weight of about 2,000 to 10 000 and an acid number of about 3 to 7, and (3) about 15 to 25 parts by weight of a polyester defined hereinafter, said dispersion being obtained by heating a mixture of (1), (2), and (3) above in the proportions stated, to effect reaction therebetween, in an organic solvent at a total concentration of (1), (2), and (3) in the range of 50 to 80% by weight and subsequently neutralizing the reaction mass with a member selected from the group consisting of aqueous ammonia and water-soluble, volatile amines, said polyester (3) containing hydroxyl groups and free carboxyl groups and having an average molecular weight of about 800 to 1500 and an acid number between about 90 and about 120, the polyester being a condensation product of an aromatic member selected from the group consisting of o-phthalic acid and its anhydride with a condensation product selected from the group consisting of a polyester having an acid value of not over 10 and obtained from the condensation of a mixture of adipic acid with trimethylolethane, the proportions in the mixture being in the range of 1.2 to 1.8 moles of trimethylolethane to each mole of acid, and modified by condensation with lauric acid; the proportion of the aromatic member to the total trimethylolethane being in the range of 2 to 3.5 moles of the former for each 3 moles of the latter.

9. A composition comprising an aqueous dispersion of a salt of a condensation product of (1) about 20 to 35 parts by weight of a xylene-soluble butylated polymethylol melamine with (2) about 40 to 65 parts by weight of a coconut oil-modified glycerol phthalate having an average molecular weight of about 2,000 to 10,000 and an acid number of about 3 to 7, and (3) about 15 to 25 parts by weight of a polyester defined hereinafter, said dispersion being obtained by heating a mixture of (1), (2), and (3) above in the proportions stated, to effect reaction therebetween, in an organic solvent at a total concentration of (1), (2), and (3) in the range of 50 to 80% by weight and subsequently neutralizing the reaction mass with a member selected from the group consisting of aqueous ammonia and water-soluble, volatile amines, said polyester (3) containing hydroxyl groups and free carboxyl groups and having an average molecular weight of about 800 to 1500 and an acid number between about 90 and about 120, the polyester being a condensation product of an aromatic member selected from the group consisting of o-phthalic acid and its anhydride with a condensation product selected from the group consisting of a polyester having an acid value of not over 10 and obtained from the condensation of a mixture of adipic acid with trimethylolethane, the proportions in the mixture being in the range of 1.2 to 1.8 moles of trimethylolethane to each mole of acid, and modified by condensation with lauric acid; the proportion of the aromatic member to the total trimethylolethane being in the range of 2 to 3.5 moles of the former for each 3 moles of the latter.

10. A composition comprising an aqueous dispersion of a salt of a condensation product of (1) about 20 to 35 parts by weight of a xylene-soluble butylated polymethylol melamine with (2) about 40 to 65 parts by weight of a glycerol phthalate polyester modified by a mixture of myristic and capric acids, having an average molecular weight between 2,000 and 10,000 and having an acid number of about 3 to 7, and (3) about 15 to 25 parts by weight of a polyester defined hereinafter, said dispersion being obtained by heating a mixture of (1), (2), and (3) above in the proportions stated, to effect reaction therebetween, in an organic solvent at a total concentration of (1), (2), and (3) in the range of 50 to 80% by weight and subsequently neutralizing the reaction mass with a member selected from the group consisting of aqueous ammonia and water-soluble, volatile amines, said polyester (3) containing hydroxyl groups and free carboxyl groups and having an average molecular weight of about 800 to 1500 and an acid number between about 90 and about 120, the polyester being a condensation product of an aromatic member selected from the group consisting of o-phthalic acid and its anhydride with a condensation product selected from the group consisting of a polyester having an acid value of not over 10 and obtained from the condensation of a mixture of adipic acid with trimethylolethane, the proportions in the mixture being in the range of 1.2 to 1.8 moles of trimethylolethane to each mole of acid, and modified by condensation with lauric acid; the proportion of the aromatic member to the total trimethylolethane being in the range of 2 to 3.5 moles of the former for each 3 moles of the latter.

References Cited in the file of this patent

UNITED STATES PATENTS

| | | |
|---|---|---|
| 2,074,814 | Smith | Mar. 23, 1937 |
| 2,218,474 | Moore | Oct. 15, 1940 |
| 2,471,396 | Light | May 24, 1949 |
| 2,681,894 | Hoenel | June 22, 1954 |
| 2,729,610 | Ehring et al. | Jan. 3, 1956 |
| 2,811,493 | Simon et al. | Oct. 29, 1957 |